(12) United States Patent
Liu

(10) Patent No.: US 6,459,591 B2
(45) Date of Patent: Oct. 1, 2002

(54) PORTABLE ELECTRONIC DEVICE WITH EASY-TO-ASSEMBLE CIRCUIT BOARD MODULE

(75) Inventor: Yi-Loh Liu, Taipei Hsien (TW)

(73) Assignee: Getac Corporation, Hsinchu Hsien (TW)

( * ) Notice: Subject to any disclaimer, the term of this patent is extended or adjusted under 35 U.S.C. 154(b) by 0 days.

(21) Appl. No.: 09/777,633

(22) Filed: Feb. 6, 2001

(30) Foreign Application Priority Data

Jul. 13, 2000 (TW) ........................................ 089212076

(51) Int. Cl.$^7$ ................................................. H05K 1/16
(52) U.S. Cl. ..................... 361/756; 361/681; 361/682; 361/686
(58) Field of Search ................................. 361/756, 753, 361/754, 681–687

(56) References Cited

U.S. PATENT DOCUMENTS

| | | | | |
|---|---|---|---|---|
| 5,973,920 A | * | 10/1999 | Altic et al. | 361/687 |
| 6,091,602 A | * | 7/2000 | Helot | 361/686 |
| 6,111,746 A | * | 8/2000 | Wahl et al. | 361/684 |
| 6,264,484 B1 | * | 7/2001 | Chien et al. | 361/686 |
| 6,266,235 B1 | * | 7/2001 | Leman | 361/681 |

* cited by examiner

Primary Examiner—Kamand Cuneo
Assistant Examiner—Tuan Dinh
(74) Attorney, Agent, or Firm—Sheridan Ross PC

(57) ABSTRACT

A portable electronic device includes a casing, a circuit board module, a display module and a fastening unit. The casing has spaced-apart horizontal top and bottom walls, each of which has parallel front and rear edges and parallel lateral edges, and a vertical surrounding wall interconnecting the front edges and the lateral edges of the top and bottom walls. The top and bottom walls and the surrounding wall cooperatively confine a receiving space with a rear opening formed between the rear edges of the top and bottom walls. The circuit board module includes a main circuit board with front and rear edges, and a mounting frame mounted on the rear edge of the main circuit board. The main circuit board is inserted into the receiving space in the casing via the rear opening such that the mounting frame is disposed to close the rear opening. The display module is mounted pivotally on the mounting frame of the circuit board module so as to be pivotable toward the casing, and is connected electrically to the main circuit board. The fastening unit is provided on the casing and the mounting frame for mounting removably the circuit board module inside the casing.

10 Claims, 5 Drawing Sheets

PORTABLE ELECTRONIC DEVICE WITH EASY-TO-ASSEMBLE CIRCUIT BOARD MODULE

BACKGROUND OF THE INVENTION

1. Field of the Invention

The invention relates to a portable electronic device, more particularly to a portable electronic device with a casing and a circuit board module that are convenient to assemble and disassemble so as to facilitate maintenance and replacement.

2. Description of the Related Art

A conventional portable electronic device, such as a notebook computer, includes a casing comprised of upper and lower casing halves, a main circuit board and disk drives, such as a hard disk drive, floppy disk drive, etc., disposed within the casing, and a liquid crystal display pivotally connected to one end of the casing. The electronic device is also provided with an input device, such as a keyboard or a touch pad. During assembly, the main circuit board is first mounted within the casing, and after the disk drives are mounted in place, the input device and the liquid crystal display are then assembled to the casing. These components have to be disassembled from the casing in a reverse procedure when maintenance is desired, which is not convenient, especially when replacement of the casing is intended to vary the appearance of the electronic device.

SUMMARY OF THE INVENTION

Therefore, the main object of the present invention is to provide a portable electronic device with a casing and a circuit board module that are convenient to assemble and disassemble so as to facilitate maintenance and replacement.

Accordingly, a portable electronic device of this invention includes a casing, a circuit board module, a display module and a fastening unit. The casing has spaced-apart horizontal top and bottom walls, each of which has parallel front and rear edges and parallel lateral edges, and a vertical surrounding wall interconnecting the front edges and the lateral edges of the top and bottom walls. The top and bottom walls and the surrounding wall cooperatively confine a receiving space with a rear opening formed between the rear edges of the top and bottom walls. The circuit board module includes a main circuit board with front and rear edges, and a mounting frame mounted on the rear edge of the main circuit board. The main circuit board is inserted into the receiving space in the casing via the rear opening such that the mounting frame is disposed to close the rear opening. The display module is mounted pivotally on the mounting frame of the circuit board module so as to be pivotable toward the casing, and is connected electrically to the main circuit board. The fastening unit is provided on the casing and the mounting frame for mounting removably the circuit board module inside the casing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
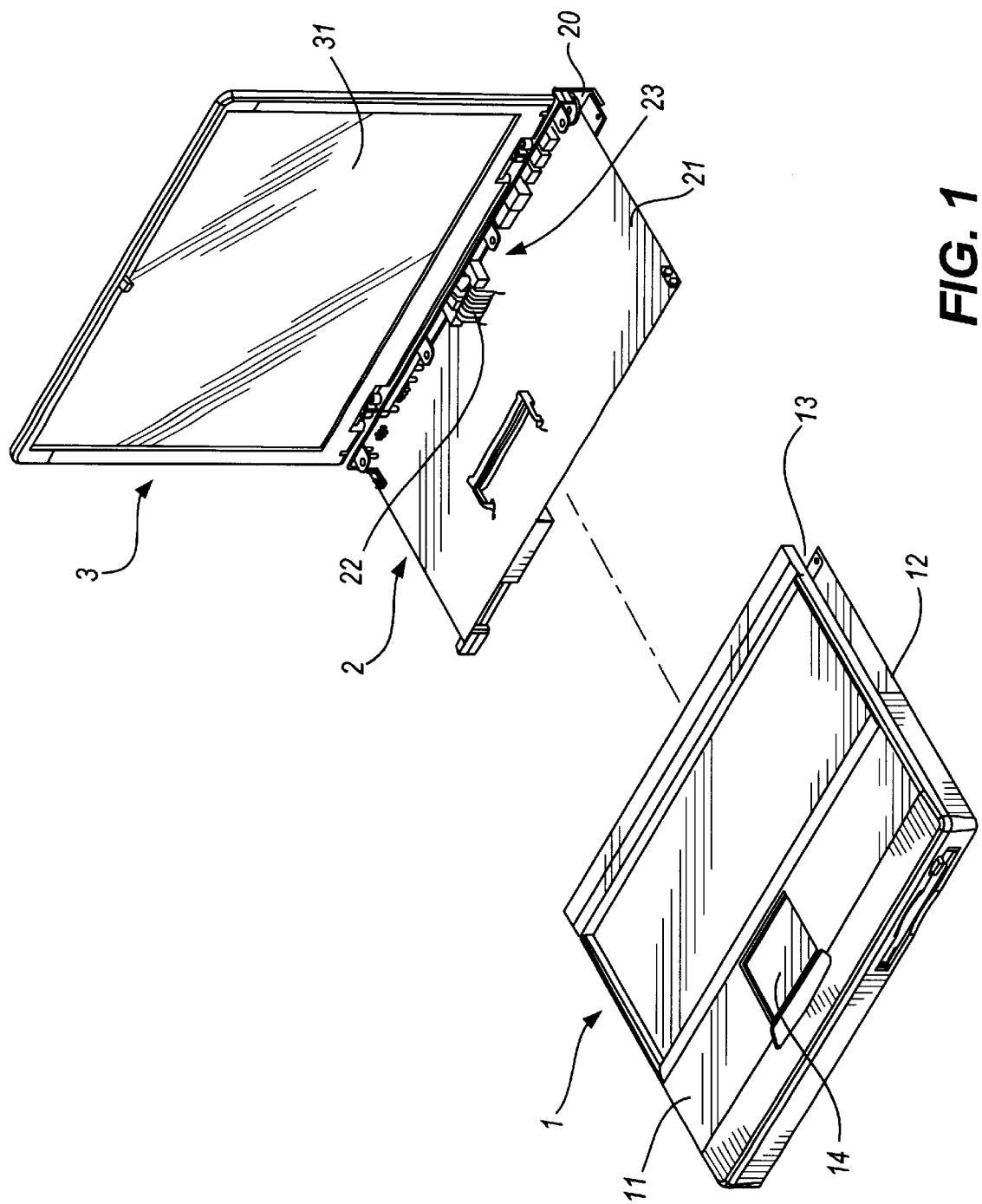
FIG. 1 is an exploded perspective view of the preferred embodiment of a portable electronic device according to the present invention.
Figure 2:
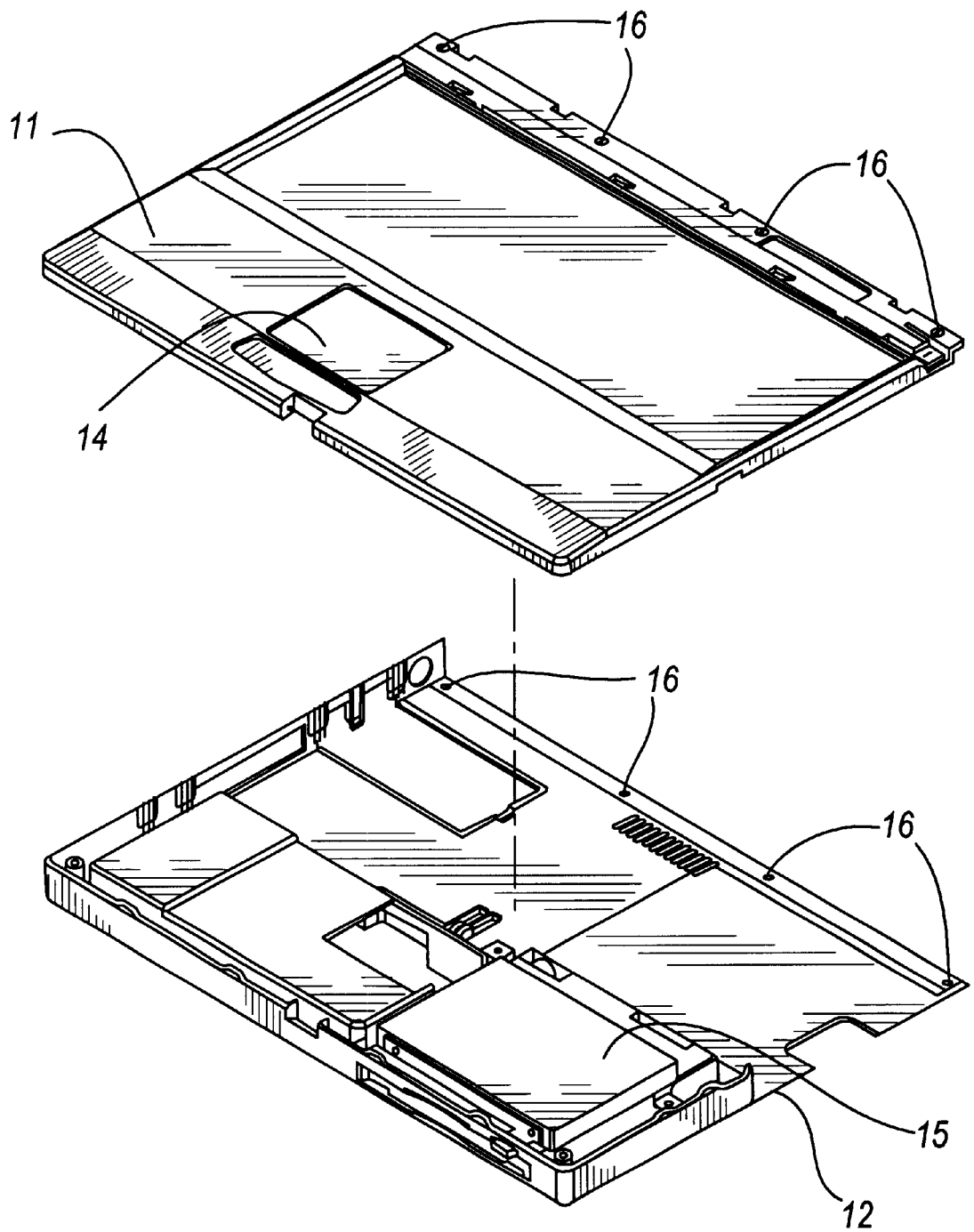
FIG. 2 is an exploded perspective view of a casing of the preferred embodiment.

Referring to FIG. 1, a portable electronic device according to the present invention is shown to be embodied in a notebook computer that includes a casing 1, a circuit board module 2, a display module 3 and a fastening unit.

The casing 1 has spaced-apart horizontal top and bottom walls 11, 12, each of which has parallel front and rear edges and parallel lateral edges, and a vertical surrounding wall interconnecting the front edges and the lateral edges of the top and bottom walls 11, 12. In this embodiment, the casing 1 is formed from upper and lower casing halves. The top and bottom walls 11, 12 and the surrounding wall cooperatively confine a receiving space with a rear opening 13 formed between the rear edges of the top and bottom walls 11, 12. In addition, the casing 1 is formed with a battery chamber (not shown) adapted for receiving a battery unit (not shown), and an insert slot (not shown) adapted for insertion of a memory card (PCMCIA card) thereinto. The circuit board module 2 includes a known main circuit board 21 with front and rear edges, and a mounting frame 20 mounted on the rear edge of the main circuit board 21. The main circuit board 21 is inserted into the receiving space in the casing 1 via the rear opening 13 such that the mounting frame 20 closes the rear opening 13. The main circuit board 21 includes a central processing unit and other control circuit components.

The display module 3 is mounted pivotally on the mounting frame 20 of the circuit board module 2 so as to be pivotable toward the casing 1. The display module 3 includes a conventional liquid crystal display panel 31 and is connected electrically to the main circuit board 21 in a known manner.

The fastening unit is provided on the casing 1 and the mounting frame 20 for mounting removably the circuit board module 2 inside the casing 1. In this embodiment, the fastening unit includes a plurality of fastening screws 40 that pass through holes 16 formed in the rear edges of the top and bottom walls 11, 12 of the casing 1, and holes 231 formed in the mounting frame 20 to thereby position the circuit board module 2 in the casing 1.

With further reference to FIGS. 2-5, the portable electronic device additionally includes an input device 14, a data storage device 15, a heat dissipating device 22 and an electrical connector set 23. The input device 14 and the data storage device 15 are connected electrically to the main circuit board 21 when the main circuit board 21 is disposed in the receiving space. In this embodiment, the input device 14 is a touch pad mounted on the top wall 11 and adapted to be operated by the user. The data storage device 15 is a disk drive, such as a hard disk drive, a floppy disk drive, or a compact disk drive, mounted on the casing 1. The connector set 23, which is mounted on the mounting frame 20 of the circuit board module 2 and which is connected electrically to the main circuit board 21, includes input and output signal terminals. The heat dissipating device 22 is mounted on the main circuit board 21 of the circuit board module 2, and is mounted adjacent to the connector set 23 to dissipate the heat generated by the central processing unit (not visible) during operation thereof.

Figure 3:
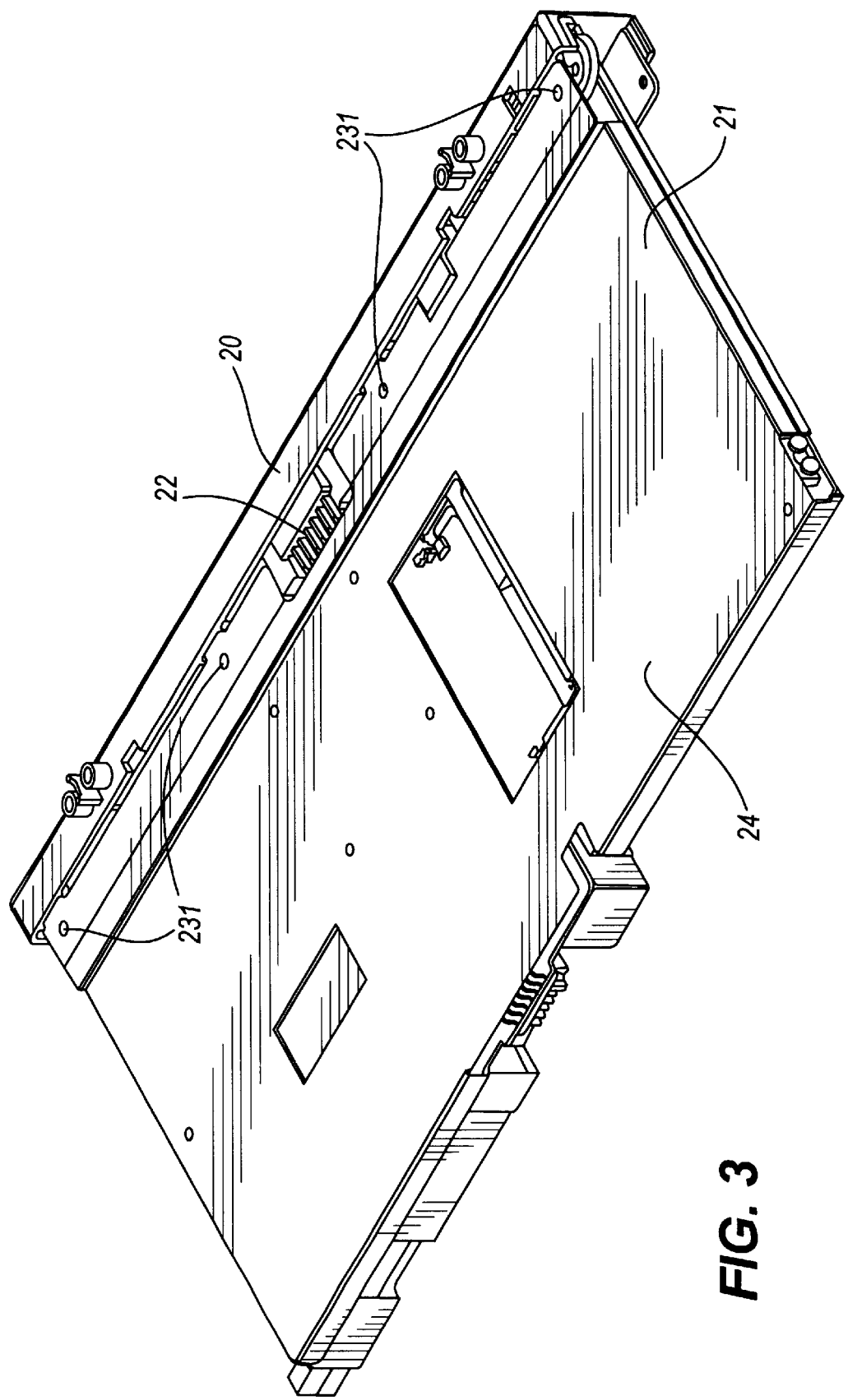
FIG. 3 is a perspective view of a circuit board module of the preferred embodiment with a protective cover.
Figure 4:
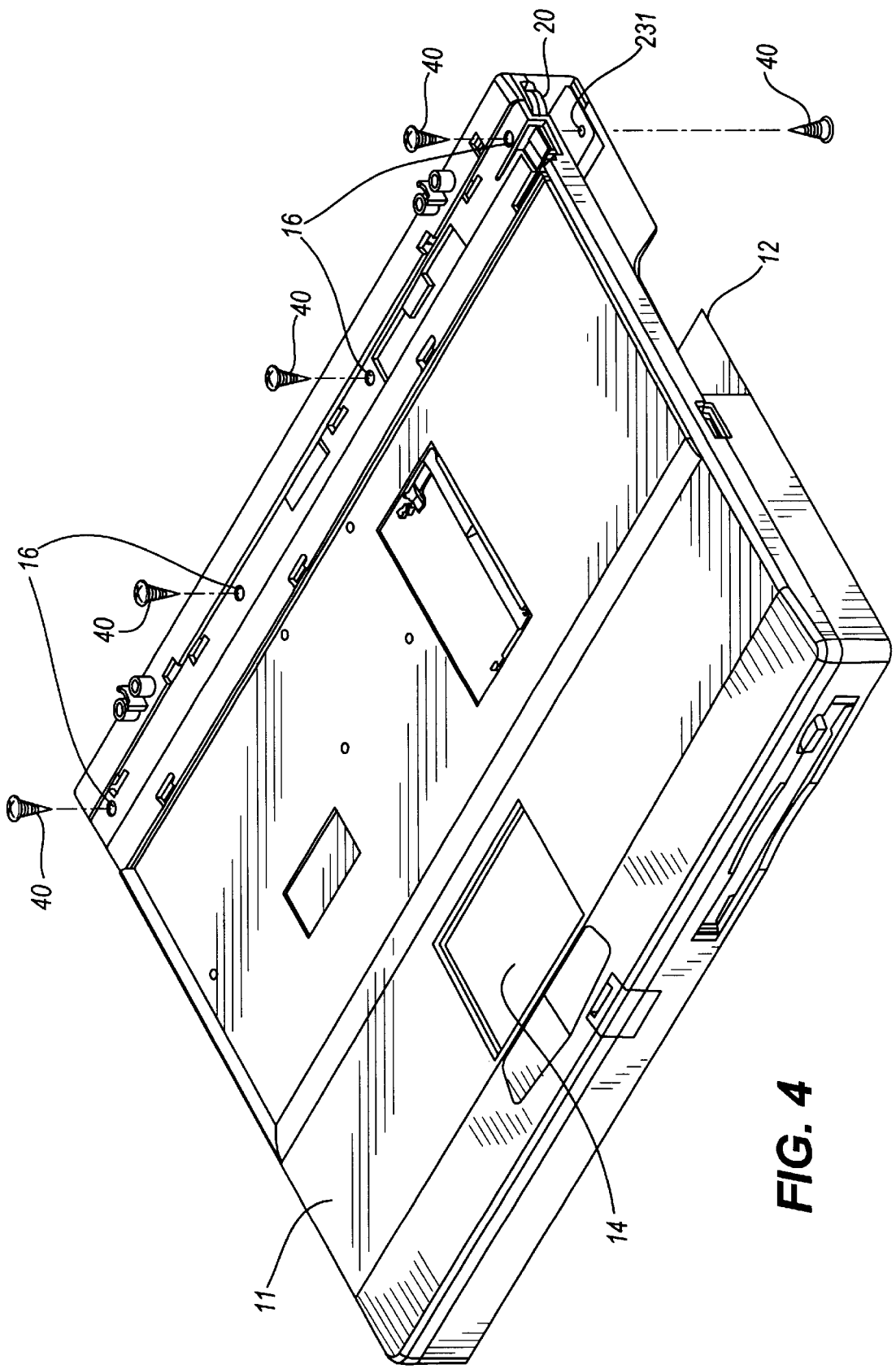
FIG. 4 is a partly exploded top perspective view of the assembly of the casing and the circuit board module.
Figure 5:
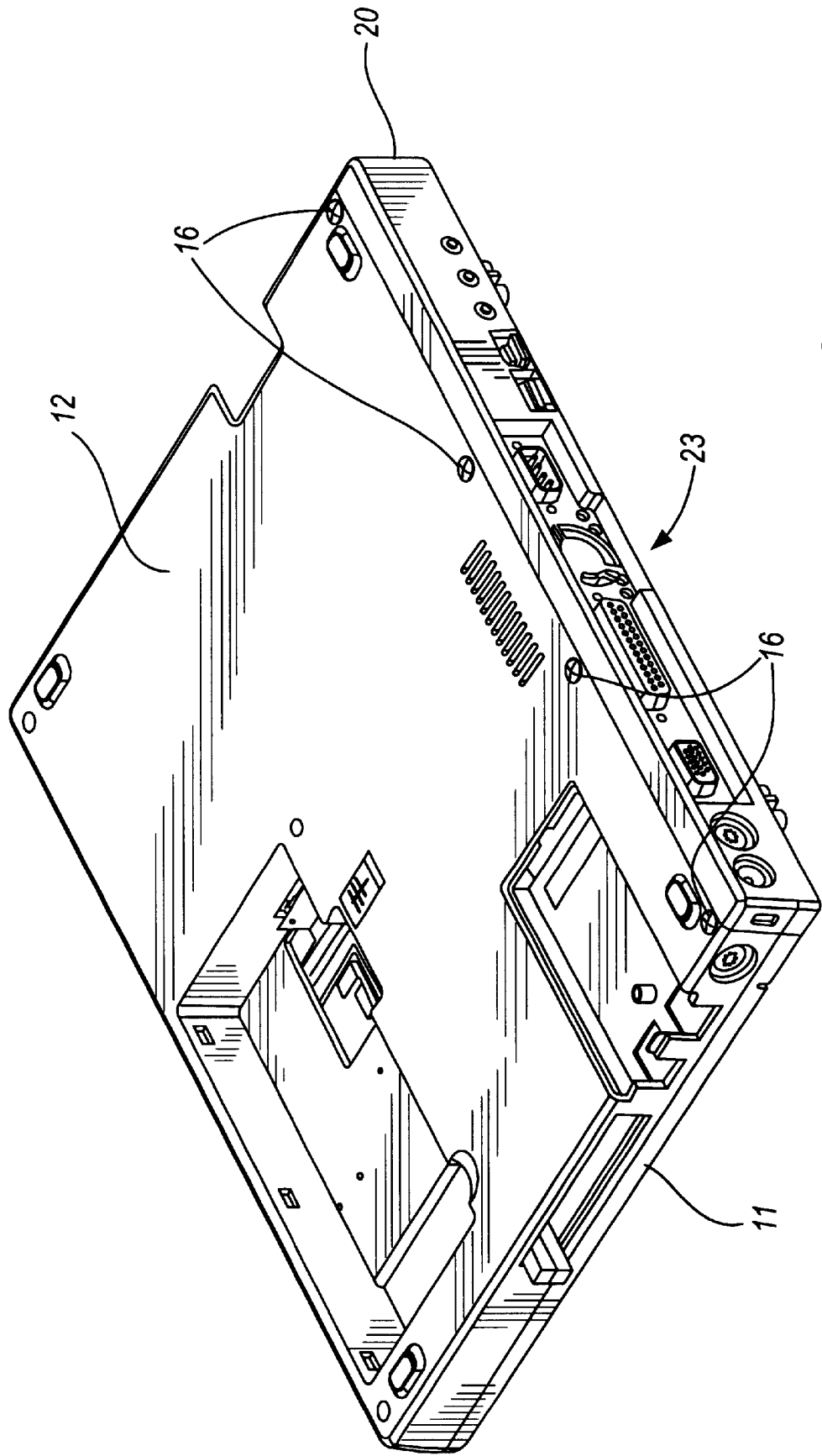
FIG. 5 is a bottom perspective view of the assembly of the casing and circuit board module.

During assembly, the main circuit board 21 can be inserted into the receiving space of the casing 1 via the rear opening 13 such that electrical contacts thereon are in electrical contact with the input device 14 and the data storage device 15, and such that the mounting frame 20 closes the rear opening 13 to achieve an even appearance, as shown in FIGS. 3, 4 and 5. The display module 3 can be mounted on the circuit board module 2 prior to or after assembly of the circuit board module 2 to the casing 1, as desired.

When maintenance of the circuit board module 2 or replacement of the casing 1 is desired, it is only necessary to remove the fastening screws 40 to permit withdrawal of the circuit board module 2 from the casing 1. As there is no need to dismantle the display module 3 from the circuit board module 2, facility is enhanced.

Furthermore, in order to prevent undesirable bumping of the electronic components on the main circuit board 21 against inner walls of the casing 1 during insertion of the circuit board module 2 into the casing 1, a protective cover 24 is mounted on and encloses the main circuit board 21 for covering the electronic components on the main circuit board 21.

By virtue of the construction of the portable electronic device of the present invention, assembly and disassembly of the circuit board module 2 and the casing 1 is simple and convenient, thereby facilitating maintenance and repair. In addition, the casing 1 can be easily replaced to meet users' demands for variety.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A portable electronic device, comprising:
    a casing having spaced-apart horizontal top and bottom walls, each of which has parallel front and rear edges and parallel lateral edges, and a vertical surrounding wall interconnecting said front edges and said lateral edges of said top and bottom walls, said top and bottom walls and said surrounding wall cooperatively confining a receiving space with a rear opening formed between said rear edges of said top and bottom walls;
    a circuit board module including a main circuit board with front and rear edges, and a mounting frame mounted on said rear edge of said main circuit board, said main circuit board being inserted into said receiving space in said casing via said rear opening after said top and bottom walls are assembled such that said mounting frame is disposed to close said rear opening; and
    a display module mounted pivotally on said mounting frame of said circuit board module so as to be pivotable toward said casing, and is connected electrically to said main circuit board.

2. The portable electronic device as claimed in claim 1, further comprising an input device and a data storage device mounted on said casing and connected electrically to said main circuit board when said main circuit board is disposed in said receiving space.

3. The portable electronic device as claimed in claim 2, wherein said input device includes a touch pad.

4. The portable electronic device as claimed in claim 2, wherein said data storage device includes a disk drive.

5. The portable electronic device as claimed in claim 1, further comprising an electrical connector set mounted on said mounting frame of said circuit board module and connected electrically to said main circuit board.

6. The portable electronic device as claimed in claim 1, further comprising a heat dissipating device mounted on said main circuit board of said circuit board module.

7. The portable electronic device as claimed in claim 1, further comprising a protective cover for enclosing said main circuit board.

8. The portable electronic device as claimed in claim 1, wherein said display module includes a liquid crystal display panel.

9. A method of assembling a portable electronic device comprising the steps of:
    connecting a top wall to a bottom wall, the top wall and bottom wall defining a casing having a receiving space with a rear opening formed between rear edges of the top and bottom walls;
    providing a main circuit board including a mounting frame mounted to a rear edge of the main circuit board;
    inserting the circuit board through said rear opening;
    closing the rear opening by fully inserting the circuit board in the rear opening and positioning the mounting frame to cover the rear opening; and
    pivotally mounting a display module to said mounting frame and electrically coupling the display module to the main circuit board.

10. A method, as claimed in claim 9, further comprising the step of:
    mounting a protective cover over said main circuit board prior to inserting the main circuit board in the rear opening.

* * * * *